Sept. 29, 1942.        H. A. BEEKHUIS, JR        2,297,281
PROCESS FOR OXIDIZING NITROSYL CHLORIDE
Filed Sept. 26, 1939
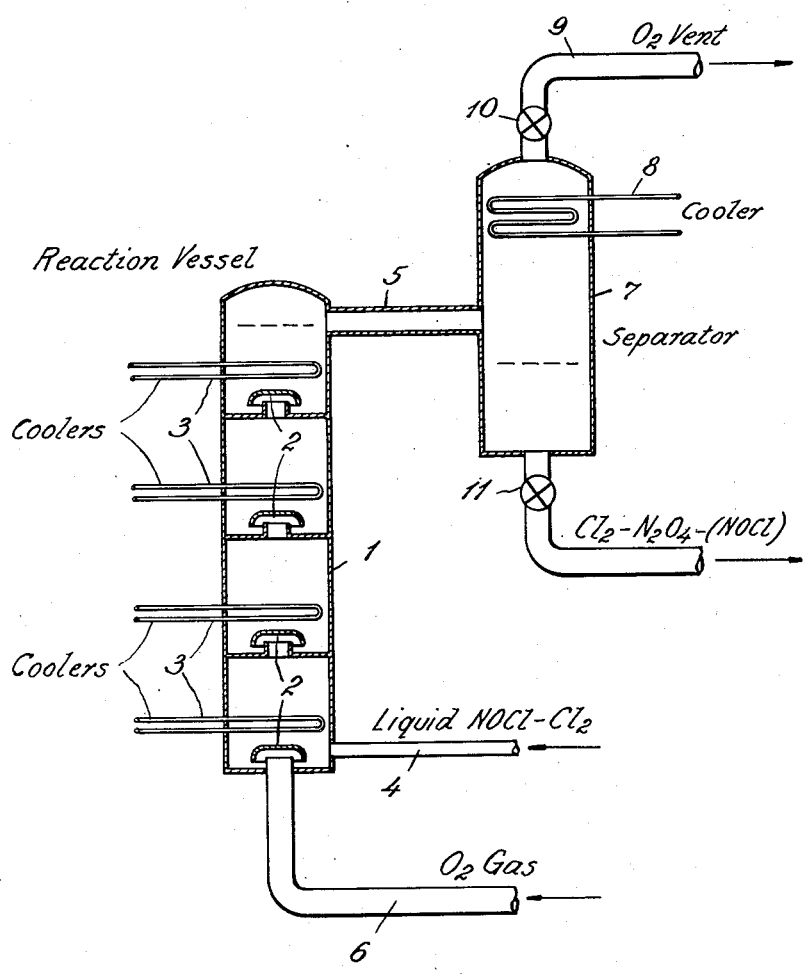
INVENTOR
Herman A. Beekhuis, Jr.
BY
Charles W. Brown
ATTORNEY Patented Sept. 29, 1942

2,297,281

UNITED STATES PATENT OFFICE 2,297,281

PROCESS FOR OXIDIZING NITROSYL CHLORIDE

Herman A. Beekhuis, Jr., Petersburg, Va., assignor to The Solvay Process Company, New York, N. Y., a corporation of New York Application September 26, 1939, Serial No. 296,553

6 Claims. (Cl. 23—157)

This invention relates to a process for the oxidation of nitrosyl chloride.

It is known gaseous mixtures of nitrosyl chloride and oxygen when heated to high temperatures of 200° to 300° C. and higher react to oxidize the nitrosyl chloride. At lower temperatures there is little or no reaction. For example, there is no appreciable oxidation of the nitrosyl chloride by the oxygen at ordinary atmospheric temperatures during periods as long as one hour. Even when a gaseous mixture of oxygen and nitrosyl chloride is passed at a slow rate through a reaction vessel in which it is heated to 150° C., the rate of reaction is very slow. For example, under these conditions I have found less than 5% of the nitrosyl chloride is oxidized when the gases are under atmospheric pressure and only about 10% is oxidized when the gases are under a pressure of 100 pounds absolute.

It appears the explanation for the small oxidation of nitrosyl chloride gas by means of oxygen at temperatures of 150° C. and below is that two reactions are involved. The first is a decomposition of the nitrosyl chloride to nitric oxide and chlorine. This is followed by oxidation of the nitric oxide by means of oxygen. The first of these reactions takes place extremely slowly at temperatures up to 150° C. and it appears to control the overall oxidation of the nitrosyl chloride.

I have now discovered liquid nitrosyl chloride reacts relatively rapidly with gaseous oxygen at temperatures, for example, of about 30° C. to about 70° C. I have discovered also liquid nitrosyl chloride and oxygen apparently react differently from gaseous nitrosyl chloride and oxygen, although in both cases the same products are formed; nitrogen peroxide and chlorine. Whereas reaction of the gases appears to involve the two reactions referred to above and to be controlled by the preliminary decomposition of the nitrosyl chloride, liquid nitrosyl chloride and oxygen appear to react directly, in the liquid phase, to form nitrogen peroxide and chlorine.

My discovery that liquid nitrosyl chloride may be oxidized by means of oxygen is of importance in providing a new and advantageous process for the oxidation of nitrosyl chloride. Nitrosyl chloride or a mixture of nitrosyl chloride and chlorine are produced by reacting nitrogen peroxide or nitric acid, respectively, with a metal chloride such as sodium or potassium chloride. The nitrosyl chloride may be recovered from the gases leaving the reaction chamber by liquefying it. Thus, an advantageous method of recovering chlorine from a gaseous mixture containing it and nitrosyl chloride is to liquefy the gases and fractionally distill the chlorine from the liquid nitrosyl chloride. It is an object of my invention to provide a process whereby the liquid nitrosyl chloride, either a relatively pure liquid or one also containing other liquefied gases such as chlorine, nitrogen peroxide, and the like, is treated with gaseous oxygen to oxidize the liquid nitrosyl chloride to nitrogen peroxide and chlorine. The resulting products may then be treated in any desired manner; for example, the chlorine may be separately recovered from the nitrogen peroxide and the latter converted into nitric acid for use for the decomposition of additional metal chloride. By employing the process of this invention to oxidize the liquid nitrosyl chloride it is unnecessary to provide the apparatus and heat required to vaporize a liquid nitrosyl chloride and to heat the gaseous nitrosyl chloride and oxygen to the high temperatures required for their reaction. The reaction products of my process may be retained in the liquid form, ready for distillation and rectification to separate a desired product. The heat of reaction may be readily removed because of a higher rate of heat transfer from a liquid than from a gaseous reaction mixture. The equilibrium for the liquid phase oxidation reaction favors essentially complete oxidation. Accordingly, it is feasible to obtain a higher percentage oxidation of the nitrosyl chloride and utilization of the oxygen when the reaction involves liquid rather than gaseous nitrosyl chloride. Under the conditions for carrying out the reaction in the liquid phase there is less corrosion of equipment made of nickel or nickel alloys.

The process of this invention involves directly contacting liquid nitrosyl chloride with oxygen thereby oxidizing the nitrosyl chloride to nitrogen peroxide and chlorine. The liquid nitrosyl chloride may initially contain dissolved in it materials such as chlorine and nitrogen tetroxide, which are products of the oxidation reaction. It may also contain other materials, for example nitric acid, hydrochloric acid, or water. It is preferred, however, the liquid nitrosyl chloride treated with the oxygen contain less than 0.1% of free and combined water. A liquid containing more than this amount of water is corrosive towards nickel or alloys containing a high proportion of nickel, which I prefer to use for the reaction vessel in which the nitrosyl chloride is treated. "Combined water," as that term is used in the nitrosyl chloride art, includes nitric and hydrochloric acids; two mols of these acids being equivalent to one mol of water.

The process of this invention may be carried out under any conditions with respect to pressure, temperature and method of contacting the oxygen and liquid nitrosyl chloride, appropriate for maintaining the nitrosyl chloride as a liquid and intimately contacting the oxygen with the liquid nitrosyl chloride to oxidize it to nitrogen peroxide and chlorine. The following conditions are given as representative:

*Pressure.*—A gas containing oxygen, such as air or oxygen gas, may be introduced into contact with the liquid nitrosyl chloride under pressures at which the partial pressure of oxygen in the gas is 30 pounds per square inch (absolute) or higher. I prefer to use an oxygen partial pressure of 150 to 1500 pounds per square inch (absolute).

*Temperature.*—Temperatures of 25° C. and higher are suitable. It is preferred to maintain the reactants at temperatures of 50° C. to 100° C. The oxidation reaction is exothermic. Heat liberated in excess of that required to maintain the desired temperature may be removed by directly cooling the liquid or by refluxing the vapors evolved from the liquid in treating it with the oxygen gas to condense nitrosyl chloride, nitrogen peroxide and chlorine and return the condensate to the reaction mixture. Additional heat over that evolved by the reaction may be supplied to the reaction mixture to bring it up to the desired reaction temperature and, if desired, to increase the rectification of the vapors evolved therefrom.

The following examples are illustrative of the process of this invention:

*Example I.*—A liquid nitrosyl chloride containing about 93 mol percent of NOCl and about 7 mol percent of $N_2O_4$ is placed in a nickel pressure vessel and heated to 50° C. During the course of 40 minutes about 1.5 pounds of oxygen gas for every 4 pounds of the liquid is bubbled through the liquid while maintaining it at a temperature of 50° C. and under a gauge pressure of about 360 pounds per square inch. The gas leaving the reaction vessel is passed first through a condenser cooled with water and then through a refrigerating coil or pipe surrounded by a refrigerating medium at below 0° C. The condensates obtained by thus cooling the gas are allowed to flow back into the reaction vessel while the uncondensed gas escapes. After treatment of the liquid nitrosyl chloride in this manner, the liquid remaining in the reaction vessel contains, for example, 40 mol percent $Cl_2$, 50 mol percent $N_2O_4$ and only 10 mol percent of residual unoxidized nitrosyl chloride. For every 4 pounds of the original liquid nitrosyl chloride about 5 pounds of this liquid product is obtained. The product may be fractionally distilled to separately recover its constituents and utilize them in any desired manner.

Since the reaction takes place in the liquid phase, the reaction vessel preferably is designed to provide a maximum liquor volume and minimum gas volume. Intimate contact between the gas and the liquor is desirable and hence the gas is preferably introduced in such manner as to disperse it as fine bubbles throughout the liquid.

While this example illustrates a batch process, it is obvious the procedure described may be readily converted into a continuously operating one by providing several stages of contact between the gas and liquid, with the liquid progressing serially through the several stages either cocurrently or countercurrently to progression of the gas through the several stages, or with the liquid being treated with separate portions of gas supplied to the several stages.

*Example II.*—The accompanying drawing diagrammatically illustrates an apparatus suitable for continuously oxidizing nitrosyl chloride in accordance with this invention.

The apparatus of the drawing comprises a reaction vessel 1 constructed of nickel and provided with bubble caps 2 and coolers 3. A nitrosyl chloride-chlorine gas obtained by reacting aqueous nitric acid with sodium chloride is dried and is then liquefied by cooling to, for example, −40° C. The resulting liquid nitrosyl chloride-chlorine mixture is pumped through a pipe 4 into the bottom of reaction vessel 1 and fills the vessel to outflow pipe 5. Oxygen gas is pumped through a pipe 6 into the bottom of the reaction vessel and by means of bubble caps 2 is repeatedly dispersed and intimately contacted with the body of liquid in the vessel. The oxygen and liquid nitrosyl chloride-chlorine mixture are continuously pumped through the reaction vessel in the proportions of 1 pound oxygen to 4.8 pounds of NOCL and at a rate such that substantially 80% of the nitrosyl chloride in the liquid reacts with the oxygen to form nitrogen peroxide and chlorine. Heat evolved by the reaction is removed by cooling coils 3 to maintain a temperature of 60° to 70° C. in vessel 1.

Liquor containing about 70 mol percent $Cl_2$, 10 mol percent NOCl and 20 mol percent $N_2O_4$ and the residual, unreacted oxygen gas pass from the top of vessel 1 through pipe 5 into a separator 7. By means of a cooling coil 8 in the top of separator 7, supplied with refrigerated brine, the gases are cooled to 0° C. and then are vented through a pipe 9. By means of valve 10 a gauge pressure of 400 pounds per square inch is maintained on the gas at this point. The oxidized liquor and condensate from the gases are withdrawn from the bottom of the separator through a valve 11 and are passed to a rectification column where substantially pure chlorine and nitrogen peroxide are recovered from the liquor. A fraction rich in nitrosyl chloride is also recovered and returned for further treatment to reaction vessel 1 with the liquid entering through pipe 4.

Numerous changes and modifications in the process of this invention as described above may be made without departing from the scope of the invention. In general, it is advantageous to employ high pressures since this permits of increasing the partial pressure of the oxygen in the reaction mixture and of maintaining the reaction mixture under relatively higher temperatures while keeping the nitrosyl chloride liquid. Both of these factors serve to increase the rate of the reaction of the oxygen with the liquid nitrosyl chloride. High pressures also increase the ease of separating chlorine, nitrosyl chloride and nitrogen peroxide vapors from the residual oxygen gas before the latter is vented from the apparatus in which the reaction is carried out. At the preferred temperatures of 50° to 100° C. the partial pressure of the reaction liquor containing liquid nitrosyl chloride being oxidized in accordance with the process of this invention is a major proportion of the total pressure on the reaction mixture.

The presence of water, hydrochloric acid or nitric acid in liquid nitrosyl chloride has little effect on the rate of reaction of the liquid with the oxygen. However, as pointed out above, the presence of these materials is undesirable because of their corrosive effect on the nickel equipment preferably employed for carrying out the process. The corrosiveness of the mixture becomes especially greater at the point at which the liquid nitrosyl chloride and the liquor formed by its oxidation becomes saturated with water, hydrochloric acid or nitric acid and an aqueous layer forms separate from a liquid layer containing the liquid nitrosyl chloride. Accordingly, in carrying out the process of this invention, I do not employ a reaction mixture containing sufficient water to form an aqueous, liquid phase separate from the phase containing liquid nitrosyl chloride.

Rectification of the liquid mixture of nitrosyl chloride oxidation products may be carried out either separately from the oxidation of the nitrosyl chloride, as in the case of the two examples described above, or it may be accomplished within the reaction vessel simultaneously with oxidation of the nitrosyl chloride. This latter procedure simplifies the operation and permits of using the heat of reaction in the rectification of the products. On the other hand, it has the disadvantages of diluting the oxygen by the vapors undergoing rectification and the heat liberated by the oxidation reaction is not available for rectifying the vapors at a point in a rectification-reaction column below the point at which the heat is liberated. Accordingly, it is ordinarily preferred separately to oxidize the nitrosyl chloride and to vaporize products of the reaction and rectify the vapors thus obtained to recover a relatively pure constituent of the mixture produced by oxidizing the nitrosyl chloride.

I claim:

1. The process for oxidizing nitrosyl chloride which comprises intimately contacting a gas containing oxygen with liquid nitrosyl chloride initially containing a minor proportion of nitrogen peroxide at about 50° C. and under a high pressure and thereby oxidizing a substantial proportion of said nitrosyl chloride to nitrogen peroxide and chlorine.

2. The process for the production of chlorine which comprises reacting a metal chloride and aqueous nitric acid to form a gaseous mixture of nitrosyl chloride and chlorine, drying said gas mixture, thereafter liquefying therefrom a mixture of nitrosyl chloride and chlorine, and introducing a gas containing oxygen in which the partial pressure of oxygen is 150 to 1500 pounds per square inch into contact with the liquefied nitrosyl chloride-chlorine mixture at a temperature of 50° to 100° C., and intimately contacting said gas with the liquid under a pressure at which the nitrosyl chloride is maintained liquid until a substantial proportion of said liquid nitrosyl chloride is oxidized to nitrogen peroxide and chlorine.

3. The process for the production of chlorine which comprises reacting a metal chloride and aqueous nitric acid to form a gaseous mixture of nitrosyl chloride and chlorine, drying said gas mixture, thereafter liquefying therefrom a mixture of nitrosyl chloride and chlorine, fractionally distilling chlorine from the liquefied mixture, and intimately contacting the liquefied nitrosyl chloride thus separated from chlorine with a gas containing oxygen at a temperature of 50° to 100° C. and under a pressure at which the nitrosyl chloride is maintained liquid and the partial pressure of oxygen in the gas introduced into contact with the liquid is 150 to 1500 pounds per square inch, thereby oxidizing a substantial proportion of said liquid nitrosyl chloride to nitrogen peroxide and chlorine.

4. The process for the production of chlorine which comprises reacting a metal chloride and aqueous nitric acid to form a gaseous mixture of nitrosyl chloride and chlorine, drying said gas mixture, thereafter liquefying therefrom a mixture of nitrosyl chloride and chlorine, intimately contacting the mixture of liquefied nitrosyl chloride and chlorine thus obtained with gaseous oxygen at a temperature of 60° to 70° C. and under a high pressure until a substantial proportion of said liquid nitrosyl chloride is oxidized to nitrogen peroxide and chlorine.

5. The process for oxidizing nitrosyl chloride which comprises introducing a gas containing oxygen in which the partial pressure of oxygen is not below 30 pounds per square inch into contact with liquid nitrosyl chloride, at temperatures not below 25° C., and under pressures at which said nitrosyl chloride is maintained as a liquid at the temperature at which it is contacted with said oxygen gas and intimately contacting said liquid nitrosyl chloride with said gas.

6. The process for the oxidation of nitrosyl chloride which comprises introducing a gas containing oxygen in which the partial pressure of oxygen is 150 to 1500 pounds per square inch into contact with liquid nitrosyl chloride containing less than 0.1% free and combined water at a temperature of 50° C. to 100° C. and intimately contacting said gas with said liquid nitrosyl chloride.

HERMAN A. BEEKHUIS, Jr.